United States Patent
Fang et al.

(10) Patent No.: US 9,585,050 B2
(45) Date of Patent: Feb. 28, 2017

(54) WIRELESS COMMUNICATION DEVICE AND METHOD FOR ADJUSTING MAXIMUM NUMBER OF ACCESSES THEREBY

(75) Inventors: Xia Fang, Shenzhen (CN); Yanqiang Zuo, Shenzhen (CN); Wei Liu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 333 days.

(21) Appl. No.: 14/368,498

(22) PCT Filed: Jun. 21, 2012

(86) PCT No.: PCT/CN2012/077377
§ 371 (c)(1),
(2), (4) Date: Jul. 23, 2014

(87) PCT Pub. No.: WO2013/097427
PCT Pub. Date: Jul. 4, 2013

(65) Prior Publication Data
US 2014/0347987 A1    Nov. 27, 2014

(30) Foreign Application Priority Data
Dec. 27, 2011   (CN) .......................... 2011 1 0443779

(51) Int. Cl.
*H04L 12/26*    (2006.01)
*H04L 12/28*    (2006.01)
(Continued)

(52) U.S. Cl.
CPC ......... *H04W 28/0247* (2013.01); *H04W 24/08* (2013.01); *H04W 48/06* (2013.01); *H04W 84/12* (2013.01)

(58) Field of Classification Search
CPC ...... H04L 41/0896; H04L 43/08; H04W 84/12
See application file for complete search history.

(56) References Cited

U.S. PATENT DOCUMENTS 9,065,751 B2 *   6/2015  Almhana ............ H04L 12/5695
2009/0298496 A1 * 12/2009  Pettersson ............ H04W 36/32
                                             455/434
(Continued)

FOREIGN PATENT DOCUMENTS

CN     1981481 A     6/2007
CN    101080096 A   11/2007
(Continued)

OTHER PUBLICATIONS

International Search Report in international application No. PCT/CN2012/077377, mailed on Oct. 4, 2012. (3 pages—see entire document).

(Continued)

*Primary Examiner* — Shaq Taha
(74) *Attorney, Agent, or Firm* — Oppedahl Patent Law Firm LLC

(57) ABSTRACT

A wireless communication device and a method for adjusting a maximum number of accesses thereby are provided. The wireless communication device comprises a network speed providing module and a Wireless Local Area Network (WLAN) access number control module, wherein the network speed providing module is configured to provide a speed at a network side to a WLAN side; and the WLAN access number control module is configured to adjust a maximum number of accesses of a WLAN according to the speed at the network side provided by the network speed providing module. Through the disclosure, communication quality is ensured for an Internet user by adjusting a maximum number of user accesses of Wireless Fidelity (Wi-Fi); and when the network gets worse, the access of an excess user is not allowed or some users are removed according to a user rule.

6 Claims, 2 Drawing Sheets

(51) Int. Cl.
*H04W 28/02* (2009.01)
*H04W 24/08* (2009.01)
*H04W 48/06* (2009.01)
*H04W 84/12* (2009.01)

(56) References Cited

U.S. PATENT DOCUMENTS

| | | | |
|---|---|---|---|
| 2010/0103831 A1* | 4/2010 | Caldwell | H04W 48/06 370/252 |
| 2011/0103230 A1* | 5/2011 | Iyer | H04W 48/06 370/241 |
| 2011/0117906 A1 | 5/2011 | Hosono | |
| 2013/0079054 A1* | 3/2013 | Jouin | G06F 3/1438 455/552.1 |

FOREIGN PATENT DOCUMENTS

| | | |
|---|---|---|
| CN | 101720117 A | 6/2010 |
| CN | 101765114 A | 6/2010 |
| CN | 102164077 A | 8/2011 |
| CN | 102238646 A | 11/2011 |
| JP | 2000022714 A | 1/2000 |
| JP | 2003101551 A | 4/2003 |
| JP | 2004048152 A | 2/2004 |
| JP | 2005026763 A | 1/2005 |
| JP | 2011501886 A | 1/2011 |
| WO | 2009148166 A1 | 12/2009 |

OTHER PUBLICATIONS

English Translation of the Written Opinion of the International Search Authority in international application No. PCT/CN2012/077377, mailed on Oct. 4, 2012. (4 pages—see entire document).
Supplementary European Search Report in European application No. 12862859.1, mailed on Jul. 22, 2015.

* cited by examiner

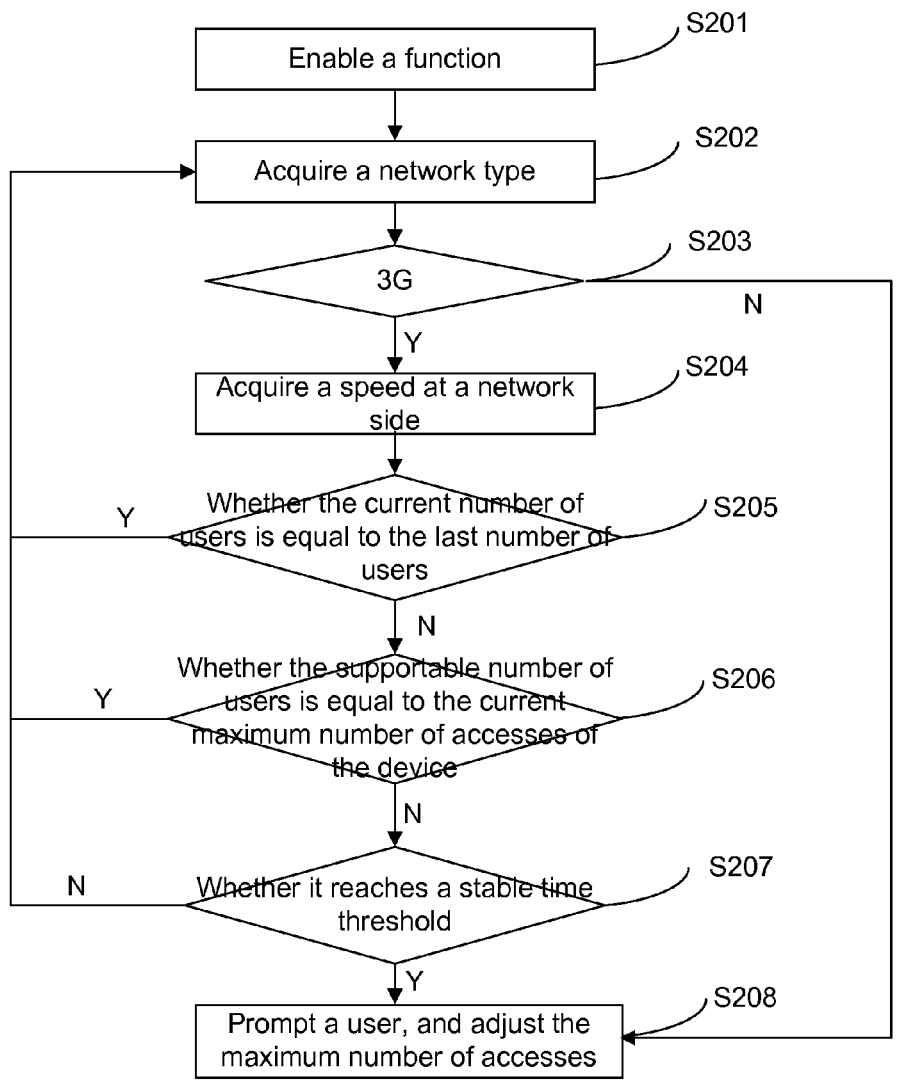

WIRELESS COMMUNICATION DEVICE AND METHOD FOR ADJUSTING MAXIMUM NUMBER OF ACCESSES THEREBY

TECHNICAL FIELD

The disclosure relates to the field of communication technologies, and in particular to a wireless communication device and a method for adjusting a maximum number of accesses thereby.

BACKGROUND

With the development and popularization of third generation (3G) mobile communication technology, a wireless network card is becoming popular. In the case of good network performance, a user can browse complex web pages, perform high-speed download, play online games, watch online videos and the like by using a wireless network card freely. Such operations are dependent heavily on a high network speed. In many cases, however, a network environment is not ideal, for example, when a network load is relatively high, or when the wireless attenuation of an environment where a user is located is relatively serious. Furthermore, some users may use a 2G network for surfing. At present, the basic situation of the 2G network is as follows: theoretical downlink speeds of Code Division Multiple Access (CDMA) 1x, General Packet Radio Service (GPRS) and Enhanced Data speed for GSM Evolution (EDGE) are 153.6 Kbps, 85.6 Kbps and 236.8 Kbps respectively. Opening any web will require traffic of hundreds of kilobytes (KB), so the GPRS can only meet general requirements of one user on traffic.

It is found in the test that a bandwidth allocated to each user is not balanced when multiple users perform downloading simultaneously, and specifically relates to the performance of devices of the users and other factors. In the case mentioned above, since the network speed is in a lower status for a long time, the surfing requirement cannot be met for some users due to very low speed allocated if the wireless network card supports the surfing of many users at the same time. At this moment, the quality of communications may be ensured by limiting the maximum number of user accesses allowed by the network card. When the network gets worse, the access of an excess user is not allowed or some users are removed according to a user rule, which cannot meet surfing requirements of users well and thus reduces the user experience. Furthermore, this function is usually used during the normal Internet services, and may be disabled if there is no requirement on data exchange or a network speed in a Wireless Local Area Networks (WLAN) used by users.

SUMMARY

The disclosure provides a wireless communication device and a method for adjusting a maximum number of accesses thereby, in order to guarantee online requirements of users by adjusting the maximum number of accesses for Wi-Fi according to the performance of a network side.

To this end, the disclosure provides a wireless communication device, which includes a network speed providing module and a Wireless Local Area Network (WLAN) access number control module, wherein the network speed providing module is configured to provide a speed at a network side to a WLAN side; and the WLAN access number control module is configured to adjust a maximum number of accesses of a WLAN according to the speed at the network side provided by the network speed providing module.

Further, the WLAN access number control module may be specifically configured to: decrease a set maximum number of accesses when a maximum number of accesses supported by the speed at the network side is less than the set maximum number of accesses, and increase the set maximum number of accesses when the maximum number of accesses supported by the speed at the network side is no less than the set maximum number of accesses.

Further, the network speed providing module may be specifically configured to acquire the speed at the network side by reading and analyzing an underlying traffic file, and provide an interface for the WLAN side.

Further, the wireless communication device may further include a network type monitoring module configured to acquire a network type and a change of the network type, and notify the WLAN side of the network type and the change of the network type.

Further, the WLAN access number control module may be further configured to: adjust the maximum number of accesses of the WLAN according to the network type and the speed at the network side; adjust the maximum number of accesses of the WLAN to 1 in the case of Code Division Multiple Access (CDMA) 1x or General Packet Radio Service (GPRS); adjust the maximum number of accesses of the WLAN to 2 in case of Enhanced Data rate for GSM Evolution (EDGE); and in the case of a 3G network, decrease the set maximum number of accesses when the maximum number of accesses supported by the speed at the network side is less than the set maximum number of accesses, and increase the set maximum number of accesses when the maximum number of accesses supported by the speed at the network side is no less than the set maximum number of accesses.

The disclosure further provides a method for adjusting a maximum number of accesses by a wireless communication device, which includes that:

a network speed providing module of a wireless communication device provides a speed at a network side to a Wireless Local Area Network (WLAN) side; and a WLAN access number control module of the wireless communication device adjusts a maximum number of accesses of a WLAN according to the speed at the network side provided by the network speed providing module.

Further, the step that the WLAN access number control module of the wireless communication device adjusts the maximum number of accesses of the WLAN according to the speed at the network side provided by the network speed providing module may include that:

a set maximum number of accesses is decreased when a maximum number of accesses supported by the speed at the network side is less than the set maximum number of accesses, and the set maximum number of accesses is increased when the maximum number of accesses supported by the speed at the network side is no less than the set maximum number of accesses.

Further, the step that a network speed providing module of a wireless communication device provides a speed at a network side to a WLAN side may include that:

the network speed providing module acquires the speed at the network side by reading and analyzing an underlying traffic file, and provides an interface for the WLAN side.

Further, the method may further include that: the network type monitoring module acquires a network type and a change of the network type, and notifies the WLAN side of the network type and the change of the network type.

Further, the method may further include that:

the WLAN access number control module adjusts the maximum number of accesses of the WLAN according to the network type; the WLAN access number control module adjusts the maximum number of accesses of the WLAN to 1 in the case of CDMA1x or GPRS; the WLAN access number control module adjusts the maximum number of accesses of the WLAN to 2 in case of EDGE; and in the case of a 3G network, the WLAN access number control module decreases the set maximum number of accesses when the maximum number of accesses supported by the speed at the network side is less than the current maximum number of accesses, and increases the set maximum number of accesses when the maximum number of accesses supported by the speed at the network side is no less than the set maximum number of accesses.

To sum up, the disclosure has the following advantages:

communication quality is ensured for an Internet user by adjusting a maximum number of user accesses of Wi-Fi; and when the network gets worse, the access of an excess user is not allowed or some users are removed according to a user rule.

BRIEF DESCRIPTION OF THE DRAWINGS

FIG. 2 is a flowchart illustrating a method for adjusting a maximum number of accesses by the wireless communication device according to an embodiment of the disclosure.

DETAILED DESCRIPTION

Figure 1:
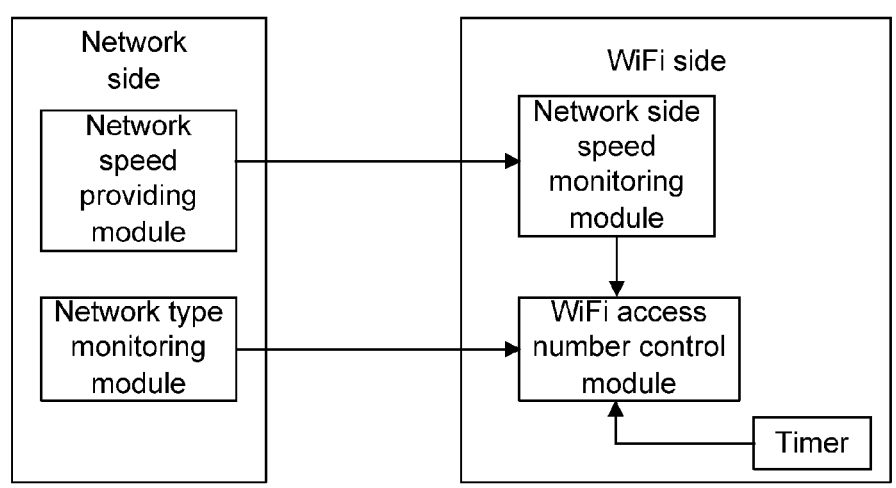
FIG. 1 is a diagram illustrating functional modules of a wireless communication device according to an embodiment of the disclosure.

The disclosure relates to a wireless communication device, and in particular to information interaction between a network side of a wireless network card and a WLAN side. In the disclosure, a network speed providing module is introduced to the network side of the wireless network card, so as to acquire the speed at the network side by reading and analyzing an underlying traffic file and provide an interface to the WLAN side. A network-side speed monitoring module and an access number control module are introduced to the WLAN side of the wireless network card, so as to adjust the maximum number of accesses of the WLAN according to the status of the network side. In the following embodiments, the WLAN, with Wi-Fi as an example, and the wireless communication device, with a wireless network card as an example, are described.

The principle of adjusting the maximum number of accesses of Wi-Fi users automatically includes: a network type monitoring module notifies detected properties of a network or detected change of the properties of the network of the access number control module of the Wi-Fi side when detecting the properties of the network or the change of the properties of the network. A Wi-Fi access number control module changes the maximum number of accesses of Wi-Fi according to the properties of the network. For example, the maximum number of accesses of Wi-Fi is adjusted to 1 in the case of CDMA1x and GPRS and is adjusted to 2 in the case of EDGE. In the case of 3G, the maximum number of accesses of the device is decreased if the maximum number of accesses which can be supported by the current speed at the network side is less than the currently-set maximum number of accesses of the device; and the maximum number of accesses of the device is increased if the maximum number of accesses which can be supported by the current speed at the network side is no less than the currently-set maximum number of accesses of the device.

If the maximum number of accesses $i_{current}$ currently supported by the network side is not equal to the current maximum number of accesses $I_0$ of the device, that is, $i_{current} \neq I_0$, $i_{current}$ may be obtained by Formula 1 as follows. In the Formula 1, i is a selectable number of accesses, the upper limit of which is the maximum number of accesses $I_{max}$ allowed by the device, $R_{basic}$ is the minimum network speed required for ensuring the normal surfing of a user, $r_{wan}(t_0)$ is the current speed at the network side, and i which meets the Formula 1 is $i_{current}$.

$$\begin{cases} (i-1) \cdot R_{basic} < r_{wan}(t_0) < i \cdot R_{basic} & (i = 1, 2 \ldots I_{max}) \\ i \neq I_0 \end{cases} \quad \text{(Formula 1)}$$

The maximum number of accesses of the device is adjusted only when the maximum number of accesses supported by the network side maintains to be a certain $i_{current}$ for a period of time and the relationship $i_{current} \neq I_0$ always holds, as shown in Formula 2. In the Formula 2, n is a time stability factor which is introduced for preventing the fluctuation of the network speed. If i changes before the time stability factor n reaches its upper limit N, the time stability factor n is reset and then re-count.

$$\begin{cases} (i-1) \cdot R_{basic} < r_{wan}\left(\begin{array}{c} t_0 + \\ n \cdot \\ \Delta t \end{array}\right) < i \cdot R_{basic} & \begin{array}{c} (i = 1, 2 \ldots I_{max}) \\ (n = 1, 2 \ldots N) \end{array} \\ i \neq I_0 \end{cases} \quad \text{(Formula 2)}$$

In the Formula 2, $R_{basic}$ is the minimum speed requiring for ensuring the normal surfing of a user, and may be set based on experience. $R_{basic}$ may be set as an optional parameter according to different speed requirements of users, such as normal browsing and high-speed download.

Embodiments of the disclosure are further elaborated below in combination with the drawings.

Refer to FIG. 1, which is a diagram illustrating functional modules of a wireless communication device according to an embodiment of the disclosure. In the embodiment, the wireless communication device includes a network-side functional module and a Wi-Fi-side functional module. The network side is a network information providing end, and includes a network speed providing module and a network type monitoring module. The network speed providing module provides the speed at the network side to the Wi-Fi side, and the network type monitoring module acquires the network type and notifies the Wi-Fi side of the change of the network type. The Wi-Fi side is a function execution end, and includes a network side speed monitoring module, a Wi-Fi access number control module and a timer.

Refer to FIG. 2, which is a flowchart illustrating a method for adjusting a maximum number of accesses according to an embodiment of the disclosure. As shown in FIG. 2, the Wi-Fi side reads the speed at the network side and the network type periodically, and modifies the maximum number of accesses of Wi-Fi according to a setting rule of the maximum number of accesses if the network side is in a 3G mode. The specific process is illustrated as follows.

Step 201: After information that a function of automatically adjusting the maximum number of accesses of Wi-Fi is enabled is received from a user, a timer periodically executes the following steps.

Step 202: A network type is acquired.

Step 203: It is determined whether a network is in the 3G mode. If the network is in the 3G mode, Step 204 is executed. If the network is not in the 3G mode, Step 208 is executed after the maximum number of accesses is set according to the current network mode.

If the network is in the 3G mode, Step 204 is executed.

If the current network mode is CDMA1x or GPRS, the maximum number of accesses of Wi-Fi is set to 1. If the current network mode is EDGE, the current maximum number of accesses is set to 2. Then, Step 208 is executed.

Step 204: The speed at a network side is acquired.

Step 205: It is determined whether the current number of users is equal to the last number of users. If the current number of users is not equal to the last number of users, Step 206 is executed. If the current number of users is equal to the last number of users, Step 202 is executed.

The maximum number of accesses $i_{current}$ that the network side can support currently is obtained according to the Formula 1. If it is read for the first time, $i_{current}$ is stored as $i_{last}$. If it is not read for the first time, it is checked whether $i_{current}=i_{last}$. If $i_{current}$ is not equal to $i_{last}$, Step 206 is executed. If $i_{current}$ is equal to $i_{last}$, Step 202 is executed.

Step 206: It is determined whether the number of users that the current network can support is equal to the current maximum number of accesses of the device. If the number of users that the current network can support is equal to the current maximum number of accesses of the device, Step 202 is executed. If the number of users that the current network can support is not equal to the current maximum number of accesses of the device, Step 207 is executed.

If the number of users that the current network can support is not equal to the current maximum number of accesses of the device, that is, $i_{current} \neq I_0$, the maximum number of accesses of Wi-Fi is adjusted automatically.

Step 207: It is determined whether it reaches a stable time threshold.

If the time stability factor n in the Formula 2 reaches its upper limit N, Step 208 is executed. If the time stability factor n in the Formula 2 does not reach its upper limit N, Step 202 continues to be executed.

Step 208: The user is prompted and the maximum number of accesses is adjusted.

If $i_{current} > I_0$, it is indicated that the network gets better, and the current maximum number of accesses of the device is directly modified to $i_{current}$.

If $i_{current} < I_0$, it is indicated that the network is in a severe state for a long time, and it is necessary to decrease the maximum number of accesses of the device. That the current number of access users exceeds the maximum number of accesses $i_{current}$ of the network is prompted to the user equipment on a User Interface (UI) or a screen, and an excess user is removed or the maximum number of accesses is increased.

If the user does not increase the maximum number of accesses manually, the maximum number of user accesses of the device is set to $i_{current}$.

If the user disables the function, the timer is off, and the maximum number of accesses of Wi-Fi is set to the maximum number of accesses that the device can support.

Of course, various other implementation ways are also available in the disclosure. Various modifications and variations can be made by those skilled in the art according to the disclosure without departing from the sprit and essence of the disclosure. Any modification, equivalent substitute, improvements or the like made within the spirit and principle of the disclosure shall fall within the scope of protection of the claims of the disclosure.

The invention claimed is:

1. A wireless communication device, comprising: a network speed providing module and a Wireless Local Area Network (WLAN) access number control module, wherein
   the network speed providing module is configured to provide a speed at a network side to a WLAN side; and
   the WLAN access number control module is configured to adjust a maximum number of accesses of a WLAN according to the speed at the network side provided by the network speed providing module,
   wherein the wireless communication device further comprises: a network type monitoring module configured to acquire a network type and a change of the network type and notify the WLAN side of the network type and the change of the network type wherein the WLAN access number control module is further configured to: adjust the maximum number of accesses of the WLAN according to the network type and the speed at the network side; adjust the maximum number of accesses of Uie WLAN to 1 in the case of Code Division Multiple Access (CDMA) 1x or General Packet Radio Service (GPRS), adjust the maximum number of accesses of the WLAN to 2 in case of Enhanced Data rate for GSM Evolution (EDGE); and in the case of a 3G network, decrease the set maximum number of accesses when the maximum number of accesses supported by the speed at the network side is less than the set maximum number of accesses, and increase the set maxim urn number of accesses when the maximum number of accesses supported by the speed at the network side is no less than the set maximum number of accesses.

2. The wireless communication device according to claim 1, wherein the WLAN access number control module is configured to: decrease a set maximum number of accesses when a maximum number of accesses supported by the speed at the network side is less than the set maximum number of accesses, and increase the set maximum number of accesses when the maximum number of accesses supported by the speed at the network side is no less than the set maximum number of accesses.

3. The wireless communication device according to claim 1, wherein the network speed providing module is configured to acquire the speed at the network side by reading and analyzing an underlying traffic file, and provide an interface for the WLAN side.

4. A method for adjusting a maximum number of accesses by a wireless communication device, comprising:
   providing, by a network speed providing module of a wireless communication device, a speed at a network side to a Wireless Local Area Network (WLAN) side; and
   adjusting, by a WLAN access number control module of the wireless communication device, a maximum number of accesses of a WLAN according to the speed at the network side provided by the network speed providing module, wherein the method further comprises:
   acquiring by a network type monitoring module of the wireless communication device, a network type and a change of the network type, and notifying the WLAN side of the network type and the change of the network type;

adjusting, by the WLAN access number control module, the maximum number of accesses of the WLAN according to the network type and the speed at the network side: adjusting the maximum number of accesses of the WLAN to 1 in the case of Code Division Multiple Access (CDMA) 1x or General Packet Radio Service (GPRS) adjusting the maximum number of accesses of the WLAN to 2 in the case of Enhanced Data rate for GSM Evolution (EDGE) and in the case of a 3G network, decreasing the set maximum number of accesses when the maximum number of accesses supported by the speed at the network side is less than the set maximum number of accesses and increasing the set maximum number of accesses when the maximum number of accesses supported by the speed at the network side is no less than the set maximum number of accesses.

5. The method according to claim 4, wherein the step of adjusting, by a WLAN access number control module of the wireless communication device, a maximum number of accesses of a WLAN according to the speed at the network side provided by the network speed providing module comprises:

decreasing a set maximum number of accesses when a maximum number of accesses supported by the speed at the network side is less than the set maximum number of accesses, and increasing the set maximum number of accesses when the maximum number of accesses supported by the speed at the network side is no less than the set maximum number of accesses.

6. The method according to claim 4, wherein the step of providing, by a network speed providing module of a wireless communication device, a speed at a network side to a Wireless Local Area Network (WLAN) side comprises:

acquiring, by the network speed providing module, the speed at the network side by reading and analyzing an underlying traffic file, and providing an interface for the WLAN side.

* * * * *